(12) United States Patent
Shinoda et al.

(10) Patent No.: US 12,340,577 B2
(45) Date of Patent: Jun. 24, 2025

(54) PREDICTION METHOD

(71) Applicant: NEC Corporation, Tokyo (JP)

(72) Inventors: Shigeki Shinoda, Tokyo (JP); Daisuke Ikefuji, Tokyo (JP); Shin Tominaga, Tokyo (JP); Yuzo Senda, Tokyo (JP); Hirofumi Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 386 days.

(21) Appl. No.: 17/781,841

(22) PCT Filed: Dec. 17, 2019

(86) PCT No.: PCT/JP2019/049340
§ 371 (c)(1),
(2) Date: Jun. 2, 2022

(87) PCT Pub. No.: WO2021/124436
PCT Pub. Date: Jun. 24, 2021

(65) Prior Publication Data
US 2023/0005258 A1 Jan. 5, 2023

(51) Int. Cl.
*G06K 9/00* (2022.01)
*G06T 7/73* (2017.01)
*G06V 20/10* (2022.01)

(52) U.S. Cl.
CPC ............. *G06V 20/182* (2022.01); *G06T 7/73* (2017.01); *G06T 2207/30181* (2013.01)

(58) Field of Classification Search
CPC ............... G06V 20/182; G06T 7/73; G06T 2207/30181; Y02A 10/40; E02B 1/00; G06Q 10/04; G06Q 50/26; G08B 31/00
See application file for complete search history.

(56) References Cited

U.S. PATENT DOCUMENTS 11,441,935 B2 * 9/2022 Liu ............................ E02B 3/00

FOREIGN PATENT DOCUMENTS

| CN | 105678984 A | * | 6/2016 | ............. G08B 31/00 |
|---|---|---|---|---|
| CN | 108133578 A | * | 6/2018 | ............. G06F 17/11 |
| CN | 112785024 A | * | 5/2021 | ............. G06F 16/29 |
| ES | 2894877 T3 | * | 2/2022 | ............. G01C 13/00 |
| JP | 2002256525 A | * | 9/2002 | ............. Y02A 10/40 |

(Continued)

OTHER PUBLICATIONS

JP Office Action for JP Application No. 2021-565196, mailed on Apr. 18, 2023 with English Translation.

(Continued)

*Primary Examiner* — Shervin K Nakhjavan

(57) ABSTRACT

A prediction device 100 of the present invention includes a detection means 121 for, on the basis of a river image that is an image obtained by capturing a river and associated with capturing position information representing a position where the river is captured, detecting river condition information representing a condition of the river at the position where the river image is captured; and a prediction means 122 for, on the basis of the capturing position information, the river condition information, and topography information representing the topography of the river, predicting a river condition representing a condition of the river at a given point of the river. The given point is different from the position represented by the capturing position information.

18 Claims, 13 Drawing Sheets

(56) References Cited

FOREIGN PATENT DOCUMENTS

| JP | 2002269656 A | * | 9/2002 | |
|----|--------------|---|--------|---|
| JP | 2007-046918 A | | 2/2007 | |
| JP | 2007047878 A | * | 2/2007 | |
| JP | 2007-205001 A | | 8/2007 | |
| JP | 2009008651 A | * | 1/2009 | |
| JP | 4323565 B1 | * | 9/2009 | ............. Y02A 10/40 |
| JP | 2018-000587 A | | 1/2018 | |
| JP | 7398816 B2 | * | 12/2023 | ............... E02B 1/00 |
| KR | 20150109116 A | * | 10/2015 | ............. G08B 19/00 |
| KR | 102247113 B1 | * | 5/2021 | .............. G01W 1/02 |

OTHER PUBLICATIONS

International Search Report for PCT Application No. PCT/JP2019/049340, mailed on Feb. 25, 2020.
Oki Electric Industry Co.,Ltd, "Research report of related technology, Research Result Report", No. 34, pp. 45-47, especially p. 47, 3.2 of right column.

* cited by examiner

Fig.7
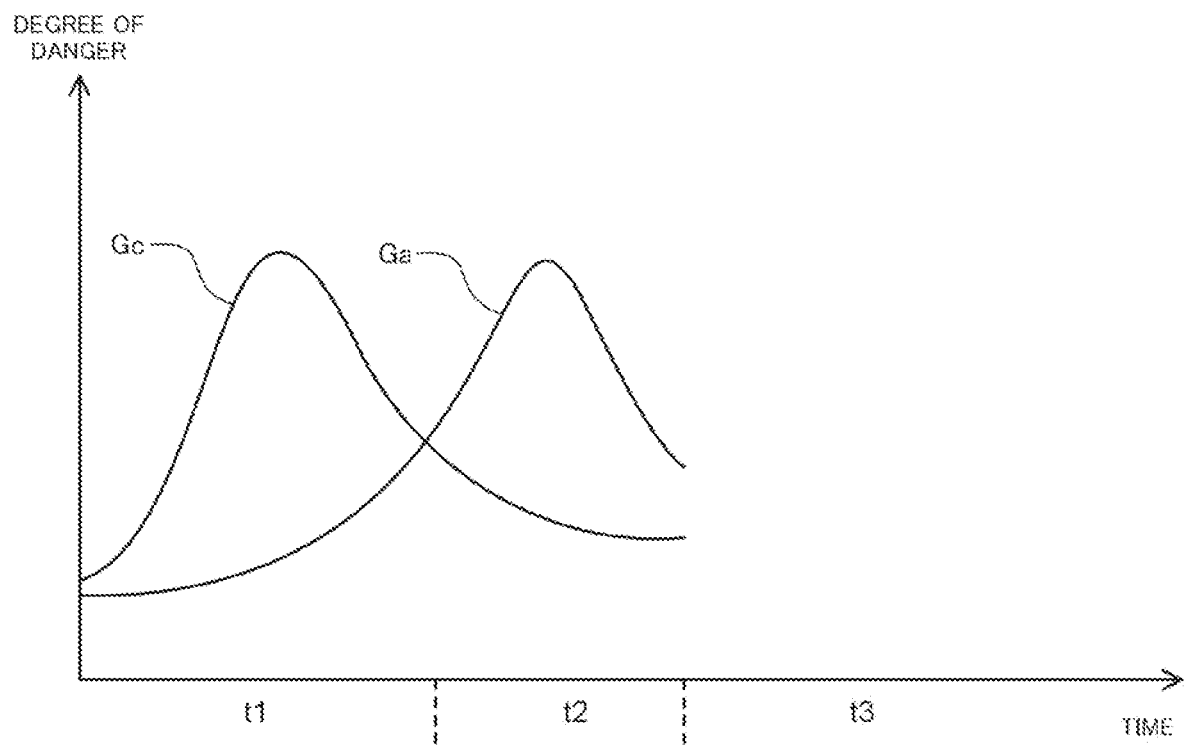
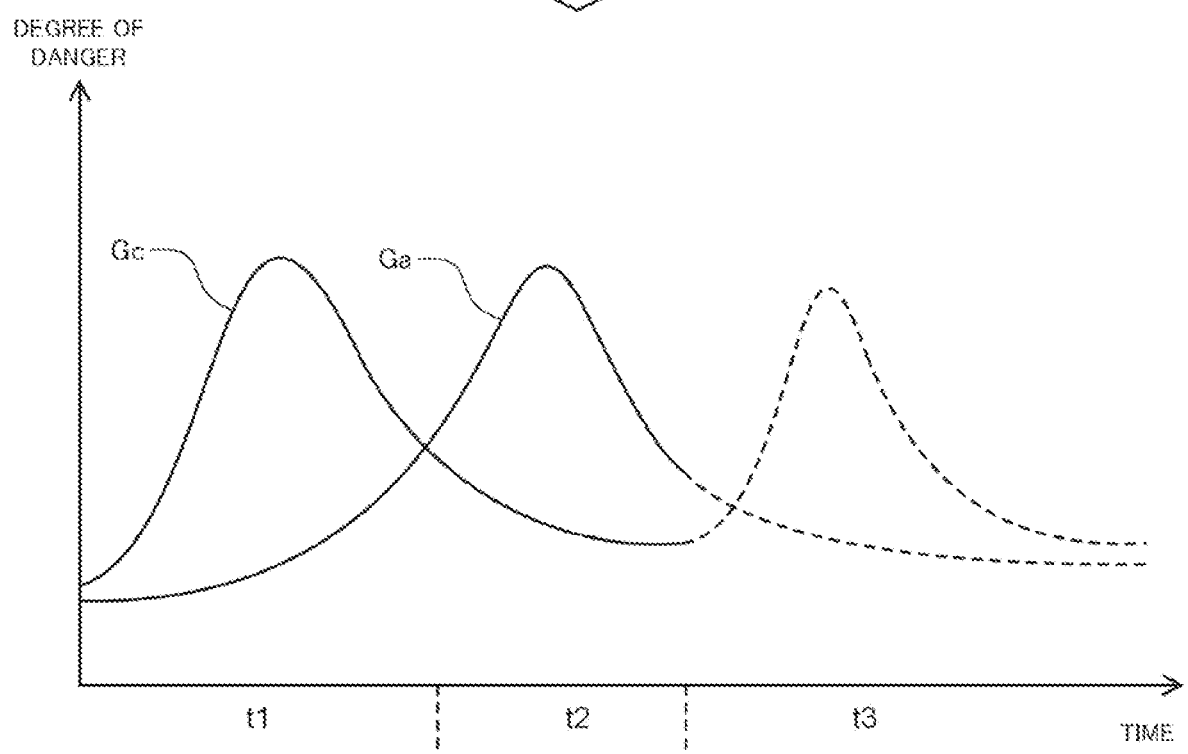

Fig.8
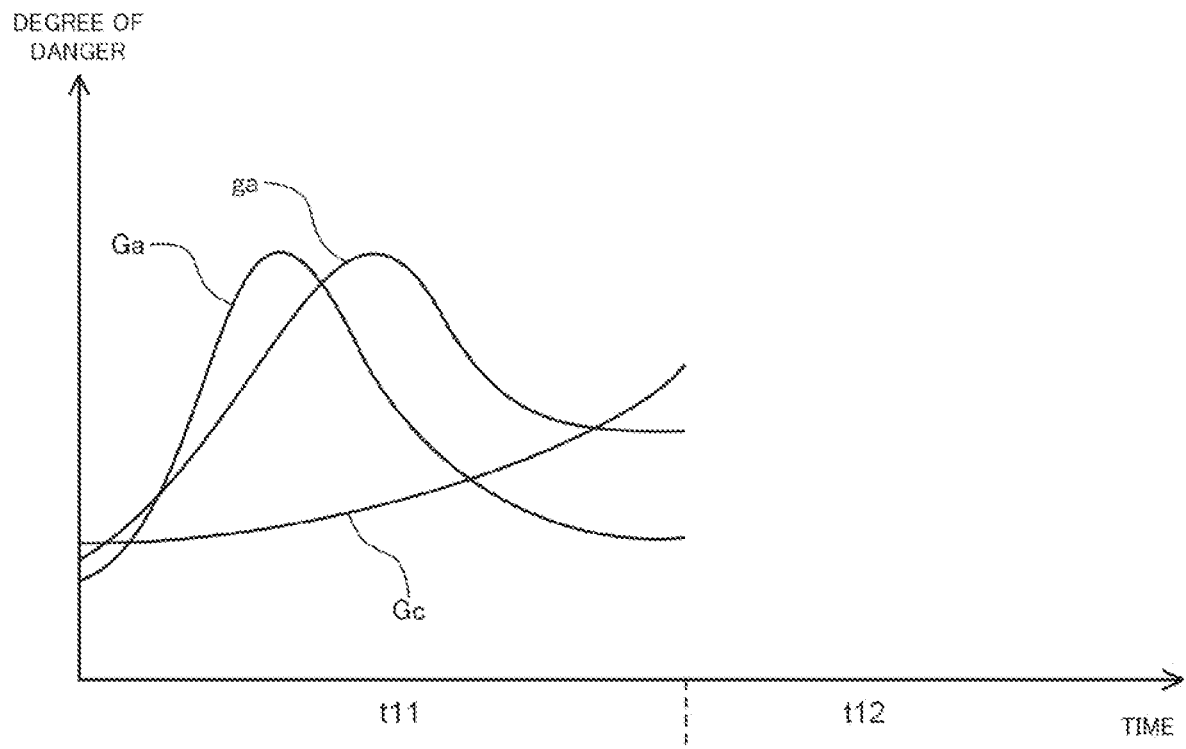
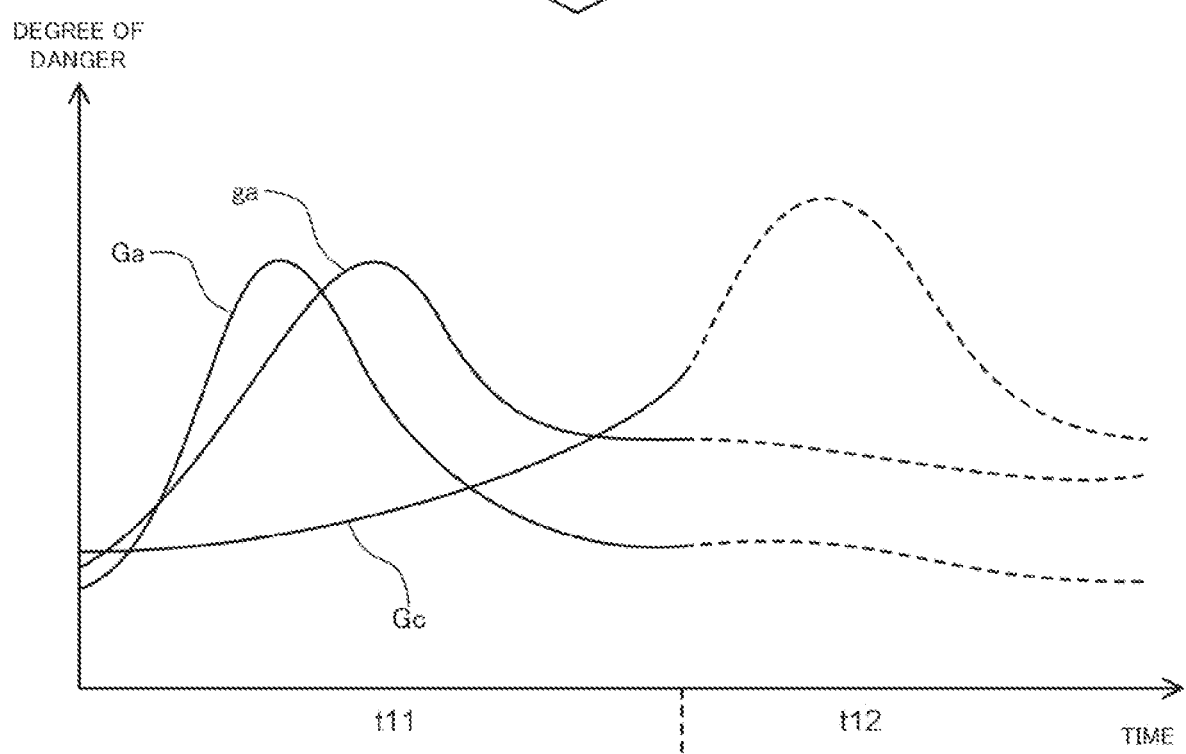

Fig.9
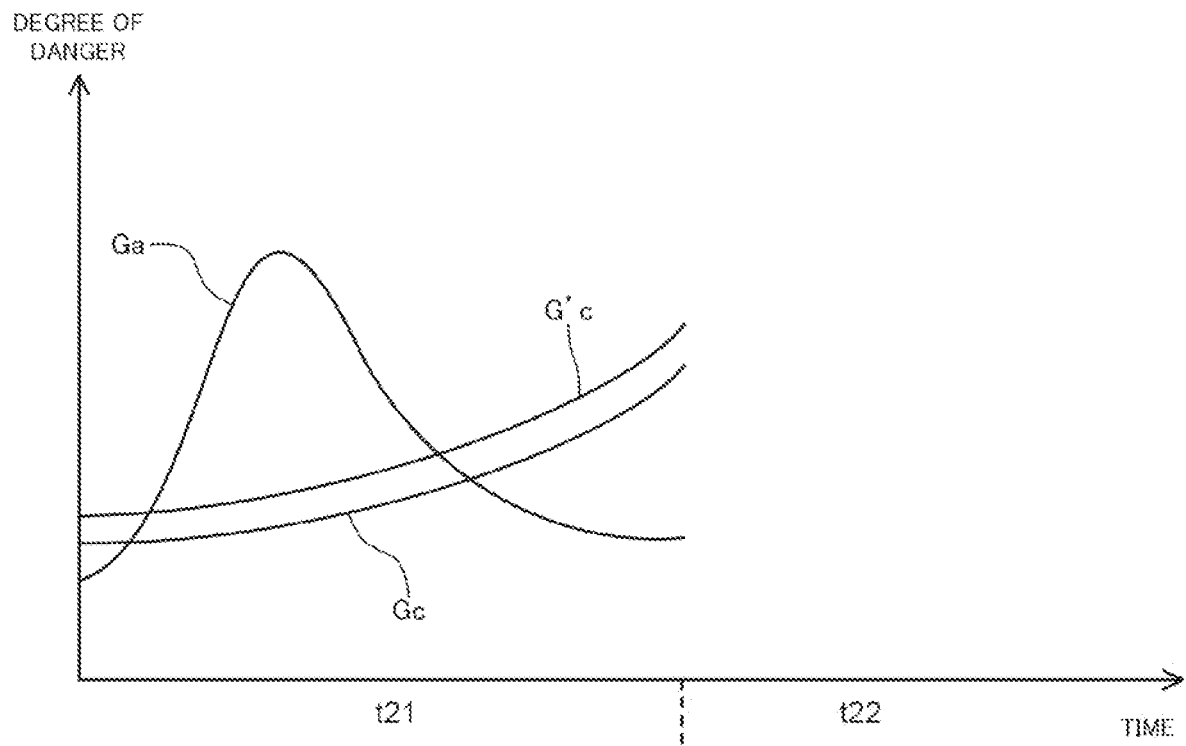
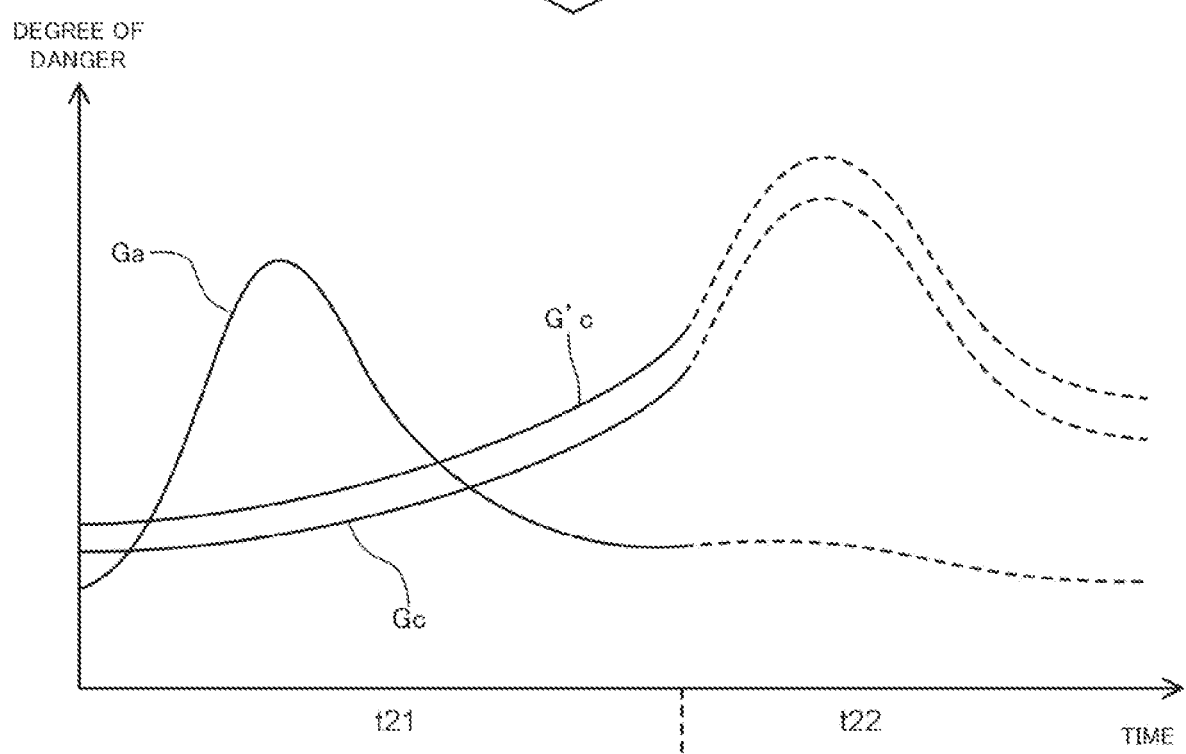

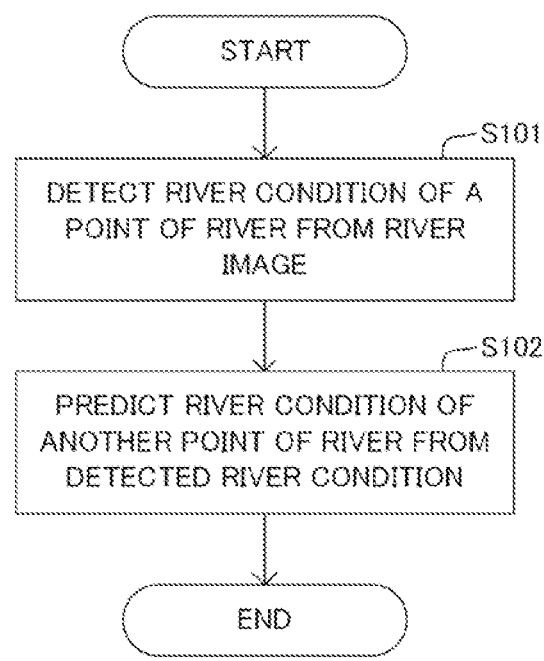

PREDICTION METHOD

This application is a National Stage Entry of PCT/JP2019/049340 filed on Dec. 17, 2019, the contents of all of which are incorporated herein by reference, in their entirety.

TECHNICAL FIELD

The present invention relates to a prediction method, a prediction device, and a program, for predicting river conditions.

BACKGROUND ART

A disaster caused by a flood of a river may occur due to a natural phenomenon such as a typhoon or heavy rain or an artificial factor. In the case of such a disaster, information related to the river is collected by institutions such as national and local governments and professional service providers, and the institutions provide alarm information representing the river conditions to general users by means of street announcement, television, radio, and the Internet using medium such as voice and images. For example, alarm information is information indicating that a river flood may occur.

For example, Patent Literature 1 discloses a system providing alarm information. In the river information management system disclosed in Patent Literature 1, rain amount/water level data is collected from a measurement device provided to the river, and weather data is also collected, and a predicted water level is calculated from the collected data. Then, the river information management system provides users with not only data of the water level of the river but also images of the river.

Patent Literature 1: JP 2007-46918 A

SUMMARY

However, the art of Patent Literature 1 described above merely calculates the water level of a river based on the data collected mainly from a measurement device provided to the river. Therefore, at a point of a river away from the place where a measurement device is installed or at a given point of a river where the number of installed measurement devices is not sufficient, it is impossible to improve the accuracy of predicting the water level. Consequently, this causes a problem that it is impossible to improve the accuracy of predicting all conditions including the water level at a given point of a river.

In view of the above, an object of the present invention is to provide a prediction method, a prediction device, and a program capable of solving the above-described problem, that is, a problem that it is impossible to improve the accuracy of predicting the conditions at a given point of a river.

A prediction method, according to one aspect of the present invention, is configured to include on the basis of a river image that is an image obtained by capturing a river and associated with capturing position information representing a position at which the river is captured, detecting river condition information representing a condition of the river at the position at which the river image is captured, and on the basis of the capturing position information, the river condition information, and topography information representing the topography of the river, predicting a river condition representing a condition of the river at a given point of the river, the given point being different from the position represented by the capturing position information.

A prediction device, according to one aspect of the present invention, is configured to include a detection means for, on the basis of a river image that is an image obtained by capturing a river and associated with capturing position information representing a position at which the river is captured, detecting river condition information representing a condition of the river at the position at which the river image is captured; and a prediction means for, on the basis of the capturing position information, the river condition information, and topography information representing topography of the river, predicting a river condition representing a condition of the river at a given point of the river, the given point being different from the position represented by the capturing position information.

A program, according to one aspect of the present invention, is configured to cause a processor of an information processing device to execute processing to:

on the basis of a river image that is an image obtained by capturing a river and associated with capturing position information representing a position at which the river is captured, detect river condition information representing a condition of the river at the position at which the river image is captured; and on the basis of the capturing position information, the river condition information, and topography information representing topography of the river, predict a river condition representing a condition of the river at a given point of the river, the given point being different from the position represented by the capturing position information.

Since the present invention is configured as described above, the present invention enables improvements in the accuracy of predicting conditions at a given point of a river.

BRIEF DESCRIPTION OF DRAWINGS

FIG. 7 illustrates an exemplary prediction process performed by the prediction device disclosed in FIG. 2.

FIG. 8 illustrates an exemplary prediction process performed by the prediction device disclosed in FIG. 2.

FIG. 9 illustrates an exemplary prediction process performed by the prediction device disclosed in FIG. 2.

FIG. 13 is a flowchart illustrating an operation of the information processing system according to the second exemplary embodiment of the present invention.

EXEMPLARY EMBODIMENTS

First Exemplary Embodiment

A first exemplary embodiment of the present invention will be described with reference to FIGS. 1 to 10. FIGS. 1 to 6 are diagrams for explaining a configuration of an information processing system, and FIGS. 7 to 10 are illustrations for explaining the processing operation of the information processing system.

[Configuration]

Figure 1:
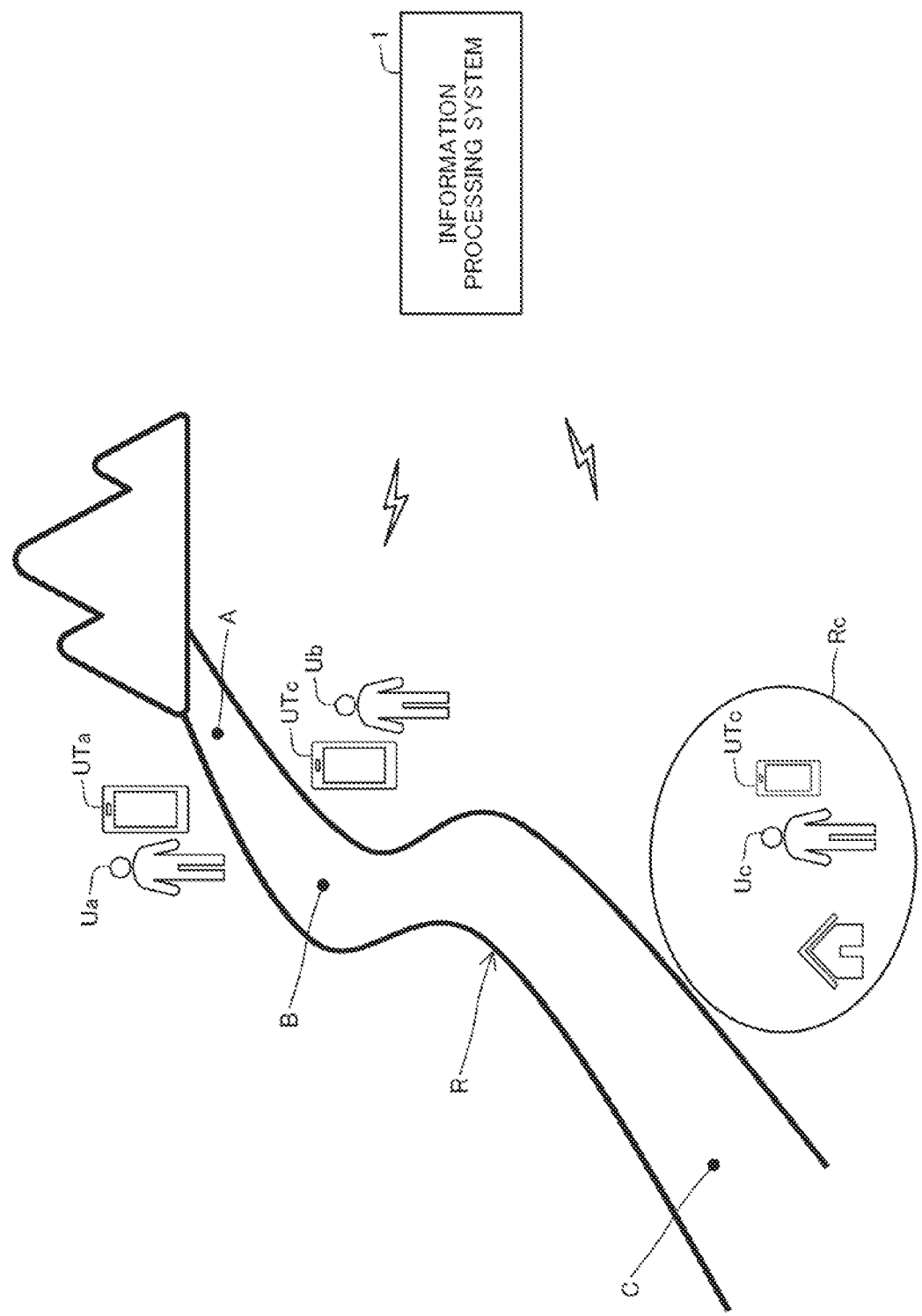
FIG. 1 is a block diagram illustrating a configuration of an information processing system according to a first exemplary embodiment of the present invention.
Figure 2:
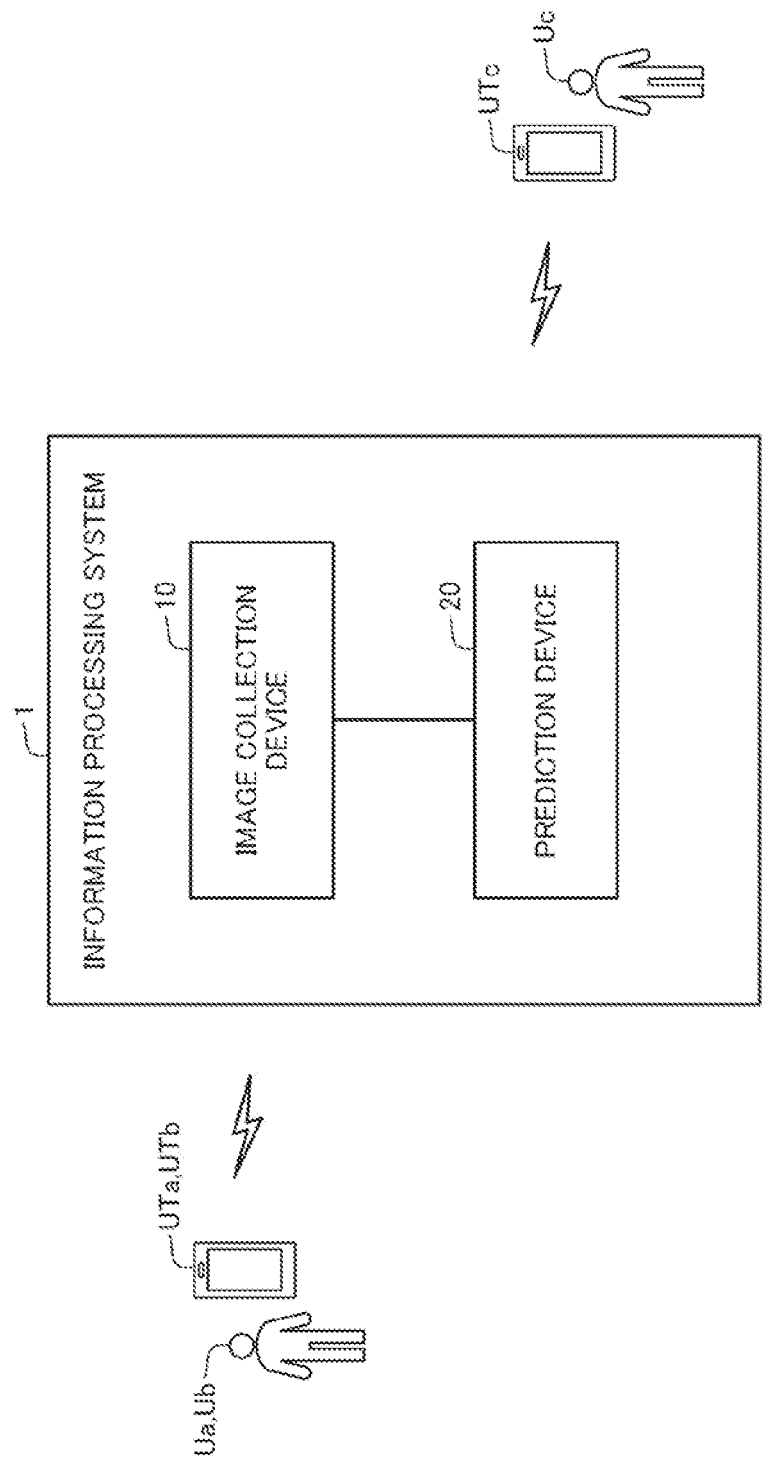
FIG. 2 is a block diagram illustrating the configuration of the information processing system disclosed in FIG. 1.

An information processing system 1 of the present invention is a system for predicting conditions such as a water level of a river, in order to suppress damages by a flood of the river. As illustrated in FIG. 2, the information processing system 1 of the present embodiment is configured to include an image collection device 10 and a prediction device 20. As illustrated in FIG. 1, the information processing system 1 is connected to user terminals UTa, UTb, and UTc held by users Ua, Ub, and Uc via wireless communication. In particular, the image collection device 10 included in the information processing system 1 is connected to the user terminals UTa and UTb held by the users Ua and Ub who capture images of points A and B of a river R, and the prediction device 20 included in the information processing system 1 is connected to the user terminal UTc of the user Uc who desires to be provided with notice information representing the conditions of the river at another point C of the river R. Hereinafter, each device will be described in detail.

Each of the user terminals UTa and UTb is configured of an information processing terminal such as a smartphone having a camera function. The user terminals UTa and UTb are held by the users Ua and Ub respectively who capture a point of the river R to obtain a river image. The users Ua and Ub may be persons in charge of monitoring the river conditions in the national or local governments or general users.

The user terminals UTa and UTb each have a function of, when capturing an image of a point of the river R, transmitting the captured river image to the image collection device 10. At that time, the user terminals UTa and UTb each transmit capturing position information representing the position of the river whose image is captured, and capturing time information representing the capturing time, to the image collection device 10 in association with the river image. The user terminals UTa and UTb also transmits, to the image collection device 10, capturing person information specifying the users Ua and Ub holding the user terminals UTa and UTb respectively, in association with the river image. Note that in the case where a user is a registered user who has already registered with the image collection device 10, the information in which the user can be identified as a registered user may be used as the capturing person information.

In the example of FIG. 1, it is assumed that at a point A located uppermost stream of the river R, the user Ua captures a river image with the user terminal UTa and transmits it to the image collection device 10. Further, it is also assumed that at a point B located relatively upstream of the river R and on the downstream side of the point A, the user Ub captures a river image with the user terminal UTb and transmits it to the image collection device 10.

While the present embodiment illustrates the case where the user terminals UTa and UTb are mobile information processing terminals as an example, they may be imaging devices fixedly provided at the points A and B of the river R. In that case, the captured river image is associated with identification information for identifying the capturing device as the capturing person information.

Further, as illustrated in FIG. 1, the user terminal UTc that is different from the user terminals UTa and UTb is configured of an information processing terminal such as a smartphone held by the user Uc who is present in a region Rc located around a point C downstream of the river R. At that time, the user Uc is a person who lives in the region Rc or temporarily stays, and has a function of registering, with the prediction device 20, information of the user Uc himself/herself so as to acquire notice information of the river conditions at the point C of the river. Specifically, the user terminal UTc has a function of transmitting and registering transmission destination information such as an email address to the prediction device 20 according to an operation by the user Uc. The user terminal UTc also has a function of transmitting position information of the own terminal to the prediction device 20 to notify the prediction device 20 thereof at certain time intervals according to an operation by the user or automatically. Note that the user Uc may be a person who is conducting a rescue operation in the region Rc in the case where inundation occurred in the region Rc around the point C of the river R in the past.

The user terminal UTc of the user Uc also has a function of receiving notice information representing the river conditions at the point C of the river R transmitted from the prediction device 20, and outputting it to the user Uc. For example, the user terminal UTc outputs sound information provided as notice information from a loudspeaker, or displays information consisting of text and images on a display screen.

Figure 3:
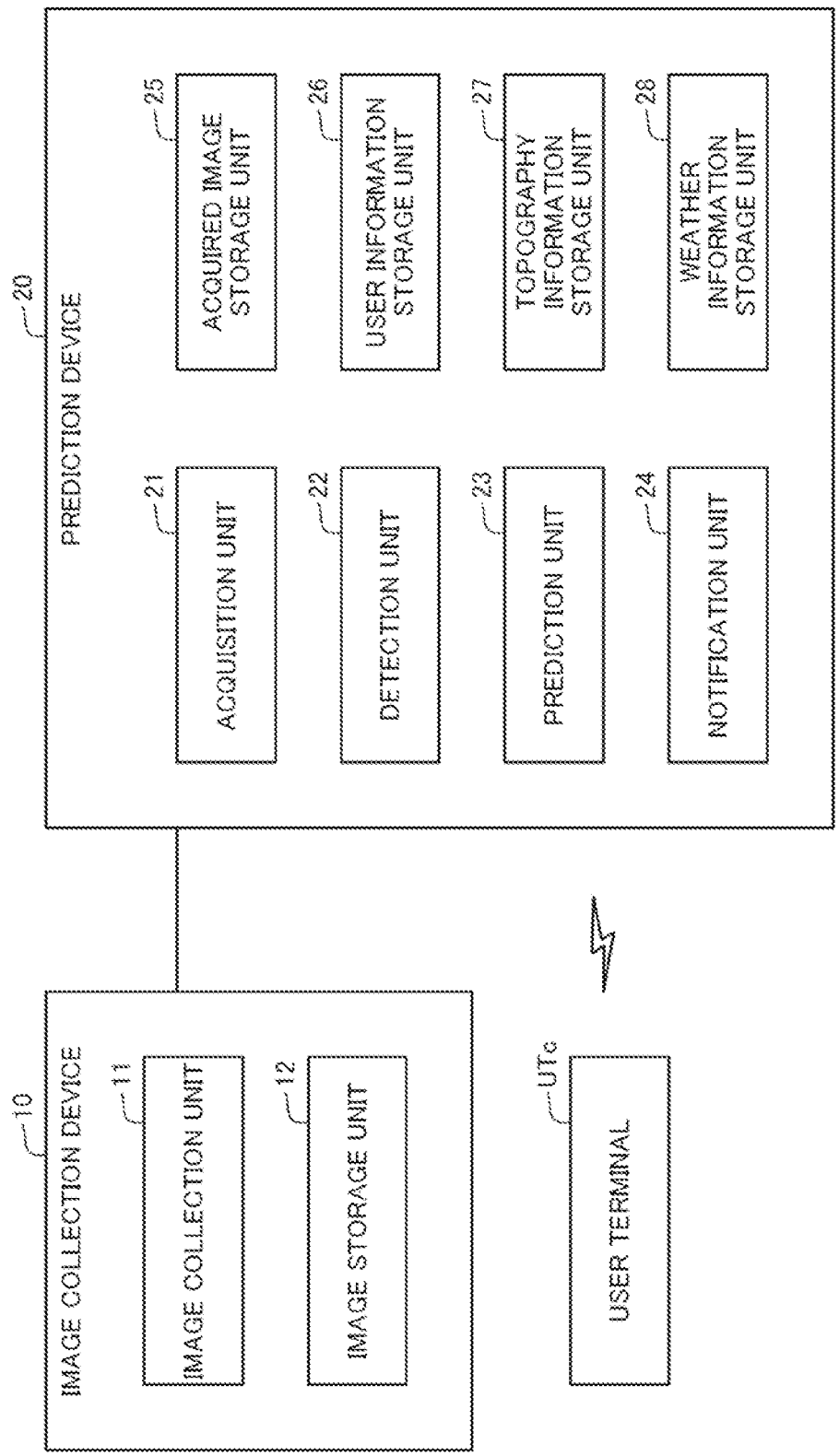
FIG. 3 is a block diagram illustrating a configuration of a prediction device and an image collection device disclosed in FIG. 2.

Next, the configuration of the image collection device 10 will be described. The image collection device 10 is configured of one or a plurality of information processing devices each having an arithmetic device and a storage device. As illustrated in FIG. 3, the image collection device 10 includes an image collection unit 11 that is constructed by execution of a program by the arithmetic device. The image collection device 10 also includes an image storage unit 12 formed in the storage device. Hereinafter, each configuration will be described in detail.

The image collection unit 11 collects river images captured and transmitted by the user terminals UTa and UTb, and stores them in the image storage unit 12. At that time, since a river image is associated with capturing position information representing the capturing position of the river, capturing time information representing the capturing time, and capturing person information representing the user who captured the captured image as metadata, the captured image and the meta data are stored in the image storage unit 12 in association with each other.

While the image collection unit 11 may collect only river images associated with the capturing person information specifying the users Ua and Ub who have been registered beforehand and store them in the image storage unit 12, the image collection unit 11 may collect river images captured by general users who are not registered and store them in the image storage unit 12. For example, the image collection unit 11 may collect river images disclosed in websites in which images captured and posted by general users are disclosed. In that case, river images are collected on the basis of information specifying the capturing location associated with the river images.

Next, the configuration of the prediction device 20 will be described. The prediction device 20 is configured of one or a plurality of information processing devices each having an arithmetic device and a storage device. As illustrated in FIG. 3, the prediction device 20 includes an acquisition unit 21, a detection unit 22, a prediction unit 23, and a notification unit 24 that are constructed by execution of a program by the arithmetic device. The prediction device 20 also includes an acquired image storage unit 25, a user information storage unit 26, a topography information storage unit 27, and a weather information storage unit 28 that are formed in the storage device. Hereinafter, each configuration will be described in detail.

The acquisition unit 21 acquires user information transmitted from the user terminal UTc according to registration of the user information by the user Uc who desires to acquire river information of a given point of the river R. For example, as user information, the acquisition unit 21 acquires point information (position information) specifying a point of the river R that the user Uc desires to acquire notice information, and transmission destination information of the notice information such as an email address that the user terminal UTc can receive. Then, the acquisition unit 21 stores the acquired user information in the user information storage unit 26 in association with the point information.

Figure 5:
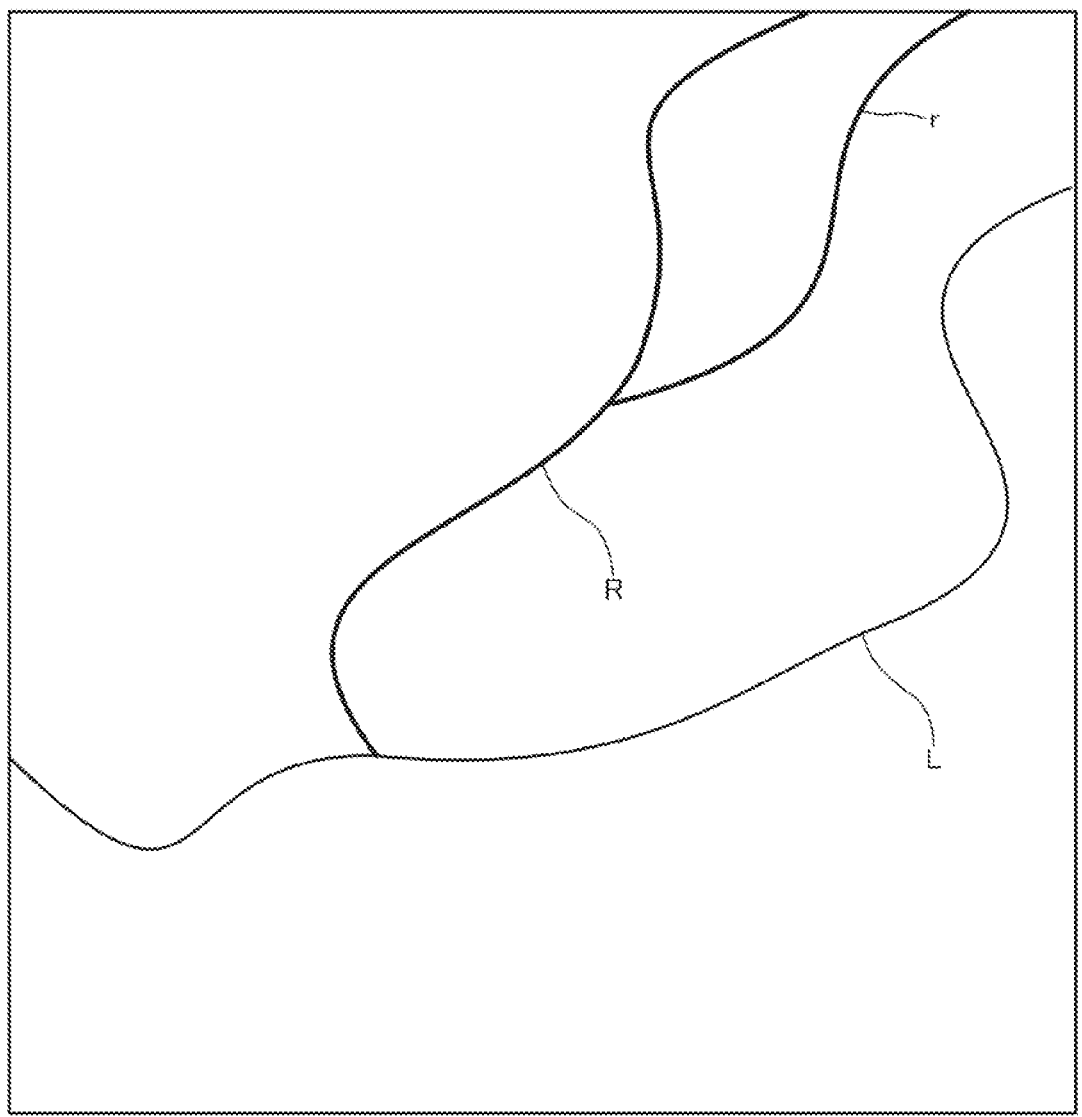
FIG. 5 illustrates exemplary topography information stored in the image collection device disclosed in FIG. 2.

The acquisition unit 21 also acquires topography information representing the topography of the river R, and stores it in the topography information storage unit 27. Here, topography information is information provided by a prescribed institution that creates map information, and is information downloaded from a web server on the Internet or read from a storage medium and stored by the prediction device 20. The topography information is information representing positions and shapes of a land L and rivers R and r as illustrated in FIG. 5 and also buildings. In particular, topography information includes the position and height of each point of the rivers R and r, the surrounding land, and buildings. With such information, it is possible to recognize the height of an embankment (bank) at each point of the rivers R and r, the width of the river, and the depth of the river.

Figure 6:
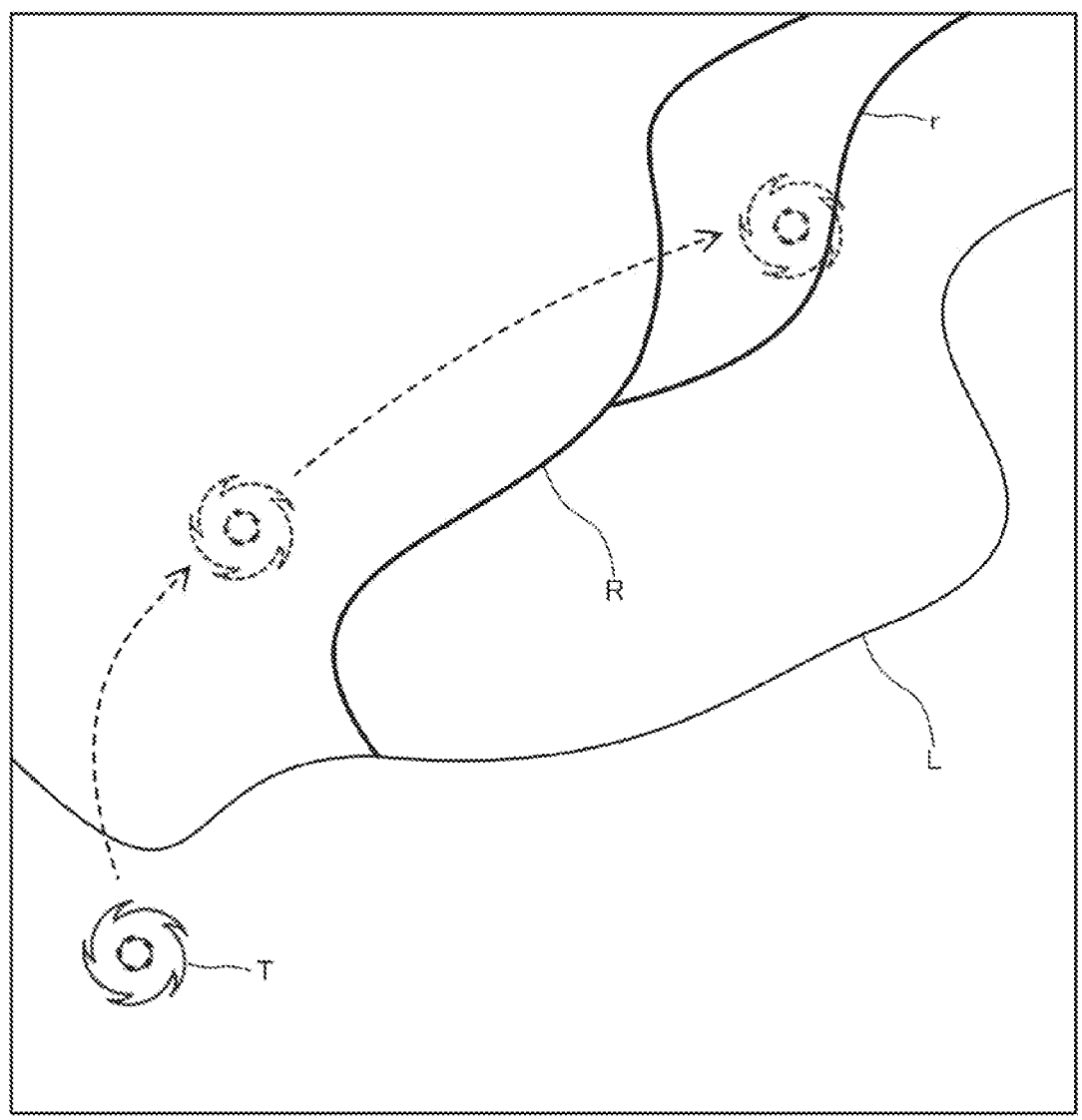
FIG. 6 illustrates exemplary weather information stored in the image collection device disclosed in FIG. 2.

Further, by referring to the topography information described above, it is possible to recognize the relevance between the main stream and a branch of the river. For example, the example illustrated in FIG. 6 shows that a river denoted by the reference numeral R is the main stream and a river denoted by the reference numeral r is a branch. Further, by referring to the topography information, it is possible to recognize the similarity in the topography of rivers. For example, when there are a plurality of rivers, in the case where upstream areas of one river and another river are the same area or the widths and depths at respective points of respective rivers are similar according to a preset reference, it can be determined that these rivers are similar in the topography.

The acquisition unit 21 also acquires weather information and stores it in the weather information storage unit 28. Here, weather information is information provided by a prescribed institution that observes and predicts the weather, and is information downloaded from a web server on the Internet or read from a storage medium and stored by the prediction device 20. The weather information is information representing all weather conditions such as weather and the amount of rainfall at each point, and information representing the current weather condition and prediction of the future weather condition. As illustrated in FIG. 6, the weather information also includes typhoon information representing a predicted path of typhoon T. Therefore, by referring to such weather information, it is possible to recognize the weather at each point of the river.

Figure 4:
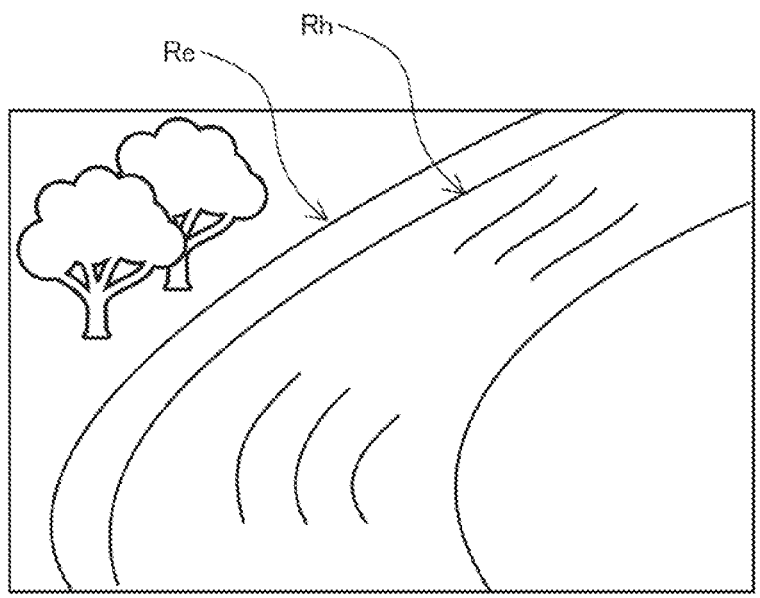
FIG. 4 illustrates an exemplary captured image stored in the image collection device disclosed in FIG. 2.

The acquisition unit 21 also acquires a river image from the image collection device 10 and stores it in the acquired image storage unit 25. The acquired river image is the same as that described above. As illustrated in FIG. 4, the acquired river image is associated with the capturing position information, the capturing time information, and the capturing person information. Note that the acquisition unit 21 may refer to the topography information and acquire only the river information in which each point of particular rivers R and r (including the main stream and a branch) is captured.

The detection unit 22 uses the acquired river image to detect river condition information representing the river condition at the point (position) where the river image is captured. At that time, the detection unit 22 uses the topography information and performs image processing on the river image to thereby detect the water level at that point as river condition information. Specifically, the detection unit 22 performs image processing on the river image to detect the top part of the embankment and the water surface part, and detect a height position Rh of the water surface with respect to a height position Re of the embankment on the image as illustrated in FIG. 4 with the reference signs. As an example, the detection unit 22 detects features on the image in the river image to thereby detect feature parts corresponding to the preset reference as a top part of the embankment and a water surface part. Then, the detection unit 22 specifies a point on the river image from the capturing position information associated with the river image, and determines the actual height of the top of the embankment (bank) at the point from the topography information of the point. The detection unit 22 also uses the determined actual height of the top of the embankment to detect the actual height position of the water surface from the height position Rh of the water surface with respect to the height position Re of the embankment on the image detected as described above. However, the detection unit 22 may detect the height position of the embankment and the height position of the water surface by means of any methods.

As the river condition information representing the river condition at the point (position) where the river image is captured, the detection unit 22 may use the acquired river image to detect another type of information representing the river condition, without being limited to detection of the height position of the water surface at that point. For example, the detection unit 22 may specify the width and the depth of the river by using the topography information, and detect the flow rate at the point as the river condition information, from the height position of the water surface detected as describe above. Further, from the relationship between the height position of the water surface and the height position of the embankment detected as described above, the detection unit 22 may detect the degree of danger (for example, the degree of inundation) at that point, calculated based on a preset reference, as river condition information.

The prediction unit 23 (prediction means) uses the river condition information detected as described above to predict a river condition representing a condition of the river at another point (given point) of the river. Specifically, the prediction unit 23 first refers to the topography information, and with respect to the specific point of the river shown in the capturing position information of the river image from which the river condition information is detected, specifies another point located downstream of the same river as a prediction object point for newly predicting the river conditions. For example, in the case of detecting the river condition information by using a river image at the point A of the river R illustrated in FIG. 1, the point C located downstream from the point A is specified as a prediction object point. As a prediction object point, the prediction unit 23 may specify a point where houses are crowded, a point where the river R is curved at a curvature that is equal to or larger than a predetermined value, a point where the river width is smaller than a predetermined value, a point where the embankment is lower than a predetermined value, or the like with use of the topography information, or may specify a point that is set in advance as a point where inundation of the river R is likely to be caused.

Then, from the river condition information of the detection point that is a point where the river condition information is detected, the prediction unit 23 uses the topography information to predict the river conditions at the prediction object point. For example, when the water level at the detection point is detected as the river condition information, the prediction unit 23 predicts the water level after a predetermined time has passed at the prediction object point located downstream from the detection point. Hereinafter, a specific example of calculating the water level at a prediction object point by the prediction unit 23 will be described. Here, description will be given under the assumption that the point A in FIG. 1 is a detection point and the point C is a prediction object point.

The prediction unit 23 calculates the flow rate of the water at the detection point A in the river R, from the water level at the detection point A and the topography information of the river R. Then, the prediction unit 23 estimates that the water having the flow rate at the detection point A reaches the prediction object point C after a predetermined time has passed, and calculates the water level at the prediction object point C by using the topography information of the river R at the prediction object point C. At that time, the prediction unit 23 predicts the water level at the prediction object point C according to a predetermined calculation formula by using, as the topography information of the river R, information such as the curvature of the shape, the inclination, and the depth of the river R and the height of the embankment at each point from the detection point A to the prediction object point C.

Further, the prediction unit 23 determines whether or not there is a branch r in the river R by using the topography information, and when there is a branch r as illustrated in FIG. 5, the prediction unit 23 predicts the water level at the prediction object point C while considering that the water in the branch r flows into the river R that is the main stream. For example, the prediction unit 23 specifies the flow rate of the wafer flowing through the branch r by detecting it from the river image captured above the branch r as similar to the above description or using a value previously set for the branch r, adds the flow rate of the water flowing with the branch r to the flow rate of the water flowing through the river R, and calculates the water level at the prediction object point C as similar to the above description.

The prediction unit 23 also reads the weather information from the weather information storage unit 28, and calculates the water level at the prediction object point C while considering the weather condition at each point of the river R. In particular, the prediction unit 23 considers the weather conditions not only at the prediction object point C of the river R but also at the points A and B (including points of branches) located upstream from the prediction object point C in the same river R and a point of the branch r. For example, when it is raining or rain is expected at the prediction object point C of the river R or the upstream side thereof, the prediction unit 23 calculates the water level at the prediction object point C as similar to that described above by adding the actual rainfall amount or expected rainfall amount to the flow rate of the water flowing through the river R. As an example, as illustrated in FIG. 6, the prediction unit 23 calculates the water level at the prediction object point C by using the expected rainfall amount at each point in the upstream of the river R and the branch r, with use of a predicted route of a typhoon T as weather information.

The prediction unit 23 predicts the river condition (for example, water level) of the prediction object point C as described above, and also predicts the time when the condition at the prediction object point C becomes the predicted river condition, by using the capturing time information at which the river image from which the river condition information at the detection point A is captured. For example, the prediction unit 23 calculates the time when the water at the detection point A will reach the prediction object point C with a preset calculation formula, by using, as the topography information, information such as the curvature of the shape, the inclination, and the depth of the river R at each point from the detection point A to the prediction object point C, and by using the calculated time, predicts the time when the condition at the prediction object point C becomes the predicted river condition. At that time, the prediction unit 23 predicts the time when the condition at the prediction object point C becomes the predicted river condition while considering presence of the branch r and an increase in the flow rate of the water due to the weather condition, as described above.

The prediction unit 23 may predict the river condition that is predicted for the prediction object point C of the river R (predetermined river) as described above as a river condition at a given point of another river. For example, on the basis of the topography information, the prediction unit 23 specifies a plurality of rivers determined to have similar topography to each other according to a preset reference. As an example, the prediction unit 23 specifies rivers in which some or all of the items such as a distance between rivers, the total volume based on the river width or depth, and a partial area of the flowing area (for example, upstream area) that can be specified from the topography information are determined to be similar to each other according to a preset reference. Then, the prediction unit 23 predicts the river condition at the prediction object point C of one river of them, and predicts such a river condition as a river condition at a given point of another one of the specified rivers.

While the case where the prediction unit 23 predicts the water level as a river condition at the prediction object point C has been described above, the prediction unit 23 may predict any condition of the river R. For example, the prediction unit 23 may predict the flow rate of the water at the prediction object point C as a river condition. Further, from the water level at the prediction object point C predicted as described above and the topography information (for example, curvature, width, and depth of the river R and the height of the embankment), the prediction unit 23 may predict the degree of danger representing the degree of inundation of the river R as a river condition.

Here, an example of predicting a river condition at a prediction object point of the river will be described with reference to FIGS. 7 to 9. Here, description will be given on the case of further predicting the degree of danger from the water level predicted at a prediction object point of a river, and predicting the degree of danger as a river condition at the prediction object point of the river.

First, the upper graph of FIG. 7 illustrates temporal changes in the degree of danger Gc at the prediction object point C of the river R and the degree of danger Ga at the detection point A located upstream thereof. In this example, first, in a time period t1, a state where the degree of danger Gc is high continues due to a heavy rain at the prediction object point C located downstream of the river R, and then in a time period t2, the degree of danger Gc is lowered. On the other hand, in the time period t2 in which the degree of danger Gc at the prediction object point C is low, the degree of danger Ga increases due to a heavy rain at the detection point A. Note that the degree of danger Ga at the detection point A in the time period t2 represents the same content as the river condition information detected from the river image of the detection point A. By predicting the degree of danger Gc at the prediction object point C in the subsequent time period t3 from the degree of danger Ga representing the river condition at the detection point A in such a condition, it is possible to predict that the degree of danger Gc increases as indicated by a dotted line in the lower graph of FIG. 7.

Further, the upper graph in FIG. 8 represents temporal changes in the degree of danger Ga at the detection point Ra of the river R, the degree of danger Ga at the prediction object point C of the river R, and the degree of danger ga at a given point of the branch r joining the river R on the upstream side of the prediction object point C of the river R. In this example, in a time period t11, the degree of danger Ga increases due to a heavy rain at the detection point A of the river R, and similarly, the degree of danger ga also increases due to a heavy rain at the given point of the branch r of the river R. It is assumed that the degree of danger Ga at the detection point A in the time period t11 represents the same content as the river condition information detected from the river image of the detection point A. It is also assumed that the degree of danger ga at the given point in the time period t11 represents the content that can be predicted from the fact that a heavy rain can be estimated from the weather information. By predicting the degree of danger Gc at the prediction object point C of the river R in the subsequent time period t12 from the river condition at the detection point A in such a condition, presence of the branch r, and the weather condition, it is possible to predict that the degree of danger Gc increases as indicated by a dotted line in the lower graph of FIG. 8.

Further, the upper graph in FIG. 9 represents temporal changes in the degree of danger Ga at the detection point Ra of the river R, the degree of danger Gc at the prediction object point C of the river R, and the degree of danger G'c at a given point of another river R' determined to have similar topography to that of the river R. For example, it is assumed that in the other river R, a point on the upstream side of the prediction object point is in the same area as that of the detection point A of the river R. In this example, in a time period t21, the degree of danger Ga increases due to a heavy rain at the detection point A of the river R, and the degree of danger Ga and the degree of danger G'c at the prediction object point C of the river R and the prediction object point of the other river R' decrease. It is assumed that the degree of danger Ga at the detection point A in the time period t21 represents the same content as the river condition information detected from the river image of the detection point A. By predicting the degree of danger Gc at the prediction object point C in the subsequent time period t22 from the river condition at the detection point A in such a condition, it is possible to predict that the degree of danger Gc increases as indicated by a dotted line in the lower graph of FIG. 9. As similar to such prediction, it can also be predicted that the degree of danger G'c at the prediction object point of the other river R' having the topography similar to that of the river R increases as indicated by a dotted line in the lower graph of FIG. 9.

In the above description, the prediction unit 23 predicts the river condition of the prediction object point C by using one type of river condition information of the detection point A of the river R. However, the prediction unit 23 may predict the river condition of the prediction object point C by using a plurality of pieces of river condition information of the detection point A. For example, it is possible to detect, from a plurality of river images captured at the detection point A, pieces of river condition information representing the river condition at the detection point A, and predicts the river condition of the prediction object point C by using the pieces of river condition information. At that time, the prediction unit 23 may use the river images whose capturing time is the same by averaging them, or use them by weighting the river condition information detected from the river images according to the priority previously set by the capturing person. Further, regarding pieces of river condition information detected from river images whose capturing time is different, the prediction unit 23 may use it while considering a time-series change in such information.

Further, in the above description, the prediction unit 23 predicts the river condition of the prediction object point C by using the river condition information at the detection point A of the river R. However, the prediction unit 23 may predict the river condition of the prediction object point C by using pieces of river condition information of a plurality of detection points A and B. For example, the prediction unit 23 may defect a distance difference or a topographical difference between the detection point A and the detection point B of the river R from the topography information, and in consideration of such a difference, may predict the river condition of the prediction object point C by using the river condition information of each of them.

The notification unit 24 (notification means) notifies the user terminal UTc of a user located at the prediction object point C of notice information that is information representing the river condition at the prediction object point C of the river R predicted by the prediction unit 23 as described above. For example, the notification unit 24 extracts user information associated with the prediction object point C of the river R from the user information storage unit 26, sets the email address included in the user information as a transmission destination, and transmits the notice information. At that time, the notice information may be the water level itself at the prediction object point predicted as a river condition, or may be a degree of danger further predicted from the water level. Further, to the notice information, the time that the condition of the river becomes the river condition, predicted along with the river condition, may be added.

However, not limited to notifying the user terminal UTc stored in the user information storage unit 26 of the notice information, the notification unit 24 may notify another user terminal. For example, the notification unit 24 may collect address information (telephone number or email address) of a user terminal such as a mobile telephone terminal and current position information from a server device operated by a mobile telephone service provider, and specify the user terminal located at the prediction object point C of the river R on the basis of the current position information, and send the notice information by using the address information of the specified user terminal as destination. Further, the notification unit 24 may also output notice information to a user located at the prediction object point C of the river R by means of street announcement, television, radio, the Internet, or the like, or using medium such as sound and images.

[Operation]

Figure 10:
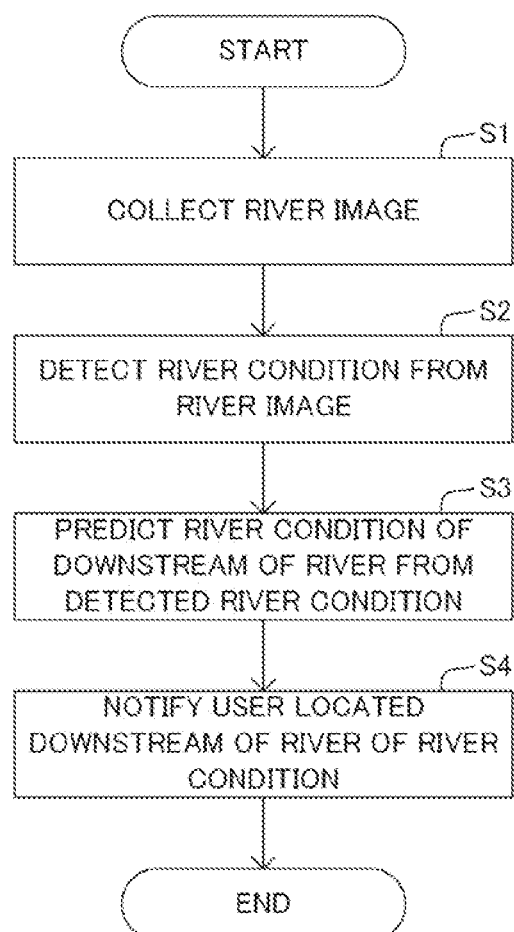
FIG. 10 is a flowchart illustrating an operation of the information processing system disclosed in FIG. 1.

Next, operation of the information processing system 1 described above will be described with mainly reference to the flowchart of FIG. 10. It is assumed that the prediction device 20 constituting the information processing system 1 acquires and stores user information of the user Uc who desires to be notified of information of the river R, and acquires and stores the topography information of the river R. It is also assumed that the prediction device 20 always acquires and stores the latest weather information.

First, as illustrated in FIG. 1, the image collection device 10 constituting the information processing system 1 collects river images captured by the users Ua and Ub at the detection points A and B located upstream of the river R (step S1). At that time, the image collection device 10 stores the capturing position information, the capturing time information, and the capturing person information in association with the river images.

Then, the prediction device 20 constituting the information processing system 1 acquires river images from the image collection device 10, and detects river condition information representing the conditions at the detection points A and B of the river R from the river images (step S2). For example, the prediction device 20 detects, as the river condition information, the height position Rh of the water surface (water level) at each of the detection points A and B of the river R, as illustrated in the river image of FIG. 4.

Then, from the detected river condition information at the detection points A and B of the river R, the prediction device 20 predicts the river condition at a point that is different from the detection points A and B of the river R, in particular, the prediction object point C on the downstream side of the detection points A and B as illustrated in FIG. 1 (step S3). At that time, the prediction device 20 uses the topography information of the river R to predict the river condition at the prediction object point C located further downstream, from the river conditions of the detection points A and B. For example, the prediction device 20 predicts the water level at the prediction object point C after a predetermined time has passed, by using information such as the curvature, the river width, the depth, and the height of the embankment, at the points A, B, and C of the river R included in the topography information. Note that the prediction device 20 may predict, as the river condition, the degree of danger representing the degree that inundation may occur at the prediction object point C, from the topography information such as a predicted water level and height of the embankment at the prediction object point C of the river R.

Further, the prediction device 20 may use the topography information to predict the river condition at the prediction object point C of the river R while considering presence of the branch r of the river R. The prediction device 20 may also predict the water level at the prediction object point C while considering the weather conditions at each point of the river R from the weather information. Further, the prediction device 20 may predict the time that the condition at the prediction object point C becomes the predicted river condition, by using the capturing time information at which the river image used for detecting the river condition information of the detection point A was captured.

Then, the prediction device 20 notifies the user terminal UTc of a user located at the prediction object point C as illustrated in FIG. 1 of notice information including the predicted river condition at the prediction object point C of the river R. For example, the prediction device 20 transmits notice information to the email address of the user Uc registered for desiring river information of the prediction object point C, or detects the user UC located at the region Rc around the prediction object point C and transmits notice information to the user terminal UTc of the user Uc.

As described above, in the present invention, the information processing system 1 first detects river condition information representing the river conditions at the detection points A and B from the river images in which the detection points A and B of the river R are captured. Then, from the river condition information of the detection points A and B of the river R, the information processing system 1 detects the river condition of the prediction object point C that is a given point of the river R different from the detection points A and B. Therefore, it is not necessary to provide a measurement device for measuring the water level or the like to the river R. Further, even when there is a shortage of measurement devices, it is possible to predict the river condition at any point of the river with high accuracy by using river images that can be obtained easily.

Then, by notifying the user Uc who is present in the area Rc around the prediction object point C of the predicted river condition at the prediction object point C of the river R, it is possible to cope with a disaster that may be caused such as inundation of the river R to seek refuge in advance.

Second Exemplary Embodiment

Figure 11:
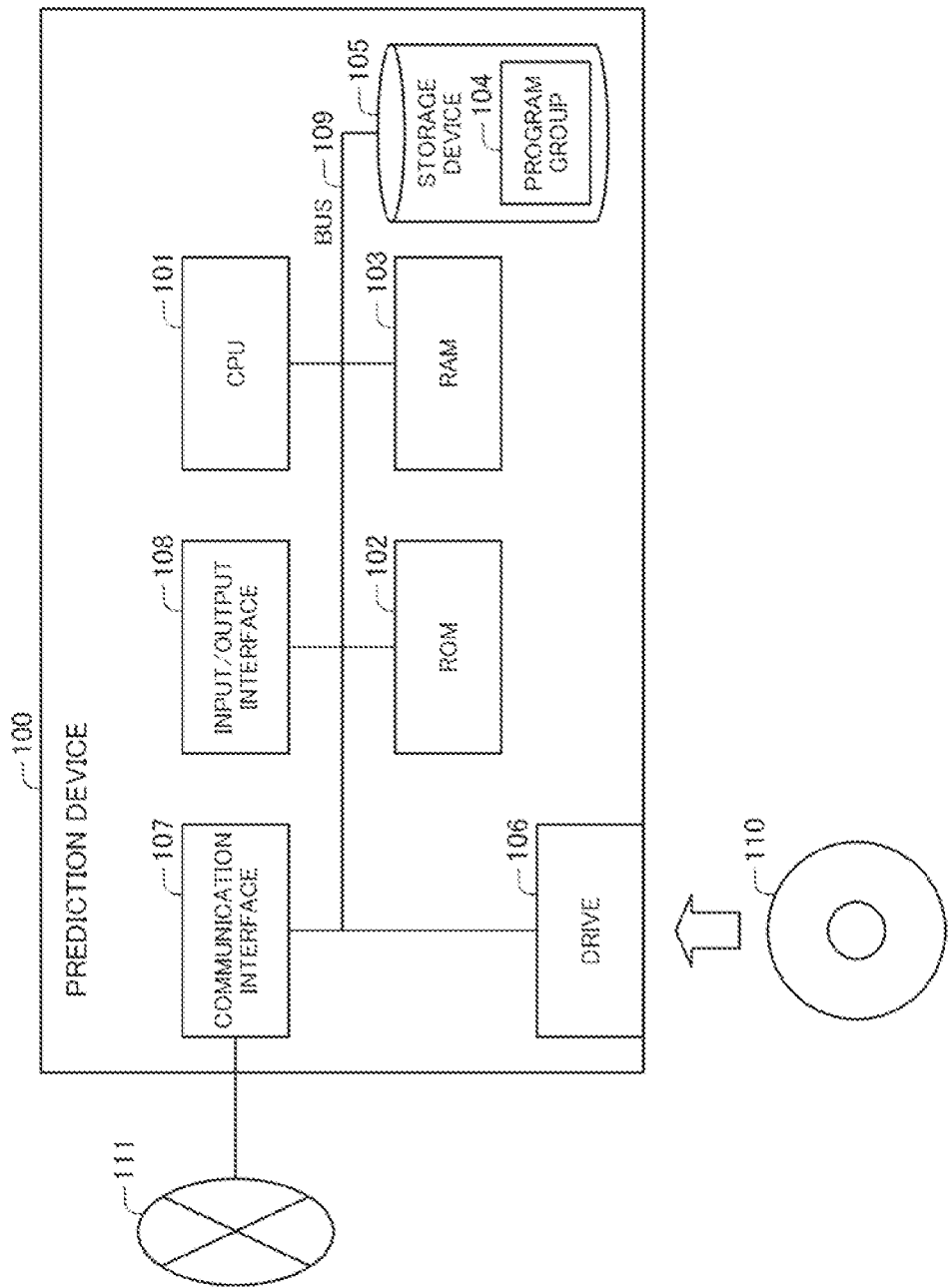
FIG. 11 is a block diagram illustrating a hardware configuration of an information processing system according to a second exemplary embodiment of the present invention.
Figure 12:
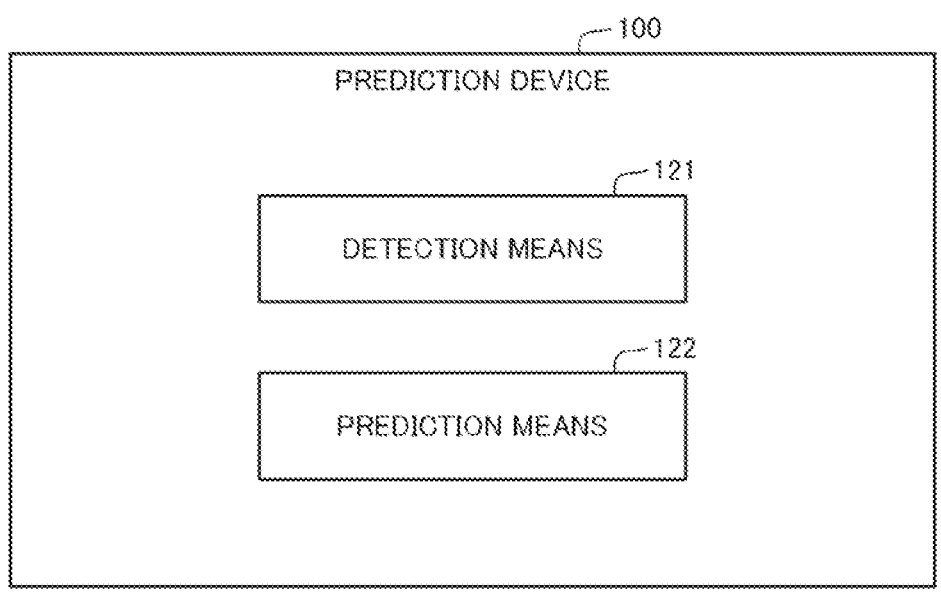
FIG. 12 is a block diagram illustrating a configuration of the information processing system according to the second exemplary embodiment of the present invention.

Next, a second exemplary embodiment of the present invention will be described with reference to FIGS. 11 to 13. FIGS. 11 and 12 are block diagrams illustrating the configuration of a prediction device of the second exemplary embodiment, and FIG. 13 is a flowchart illustrating the operation of the prediction device. Note that the present embodiment shows the outline of the configurations of the information processing system and the prediction method described in the first exemplary embodiment.

First, a hardware configuration of the prediction device 100 in the present embodiment will be described with reference to FIG. 11. The prediction device 100 is configured of at least one typical information processing device, having a hardware configuration as described below as an example.

Central Processing Unit (CPU) 101 (arithmetic device)
Read Only Memory (ROM) 102 (storage device)
Random Access Memory (RAM) 103 (storage device)
Program group 104 to be loaded to the RAM 303
Storage device 105 storing therein the program group 304
Drive 106 that performs reading and writing on storage medium 110 outside the information processing device
Communication interface 107 connecting to a communication network 111 outside the information processing device
Input/output interface 108 for performing input/output of data
Bus 109 connecting the constituent elements The prediction device 100 can construct, and can be equipped with, a detection means 121 and a prediction means 122 illustrated in FIG. 12 through acquisition and execution of the program group 104 by the CPU 101. Note that the program group 104 is stored in the storage device 105 or the ROM 102 in advance, and is loaded to the RAM 103 by the CPU 101 as needed. Further, the program group 104 may be provided to the CPU 101 via the communication network 111, or may be stored on a storage medium 110 in advance and read out by the drive 106 and supplied to the CPU 101. However, the detection means 121 and the prediction means 122 may be constructed by electronic circuits.

Note that FIG. 11 illustrates an example of a hardware configuration of the prediction device 100. The hardware configuration of the prediction device is not limited to that described above. For example, the prediction device may be configured of part of the configuration described above, such as without the drive 106.

The prediction device 100 performs the prediction method illustrated in the flowchart of FIG. 13, by the functions of the detection means 121 and the prediction means 122 constructed by the program as described above.

As illustrated in FIG. 13, the prediction device 100
  detects, on the basis of a river image that is an image obtained by capturing a river and associated with capturing position information representing the position at which the river is captured, river condition information representing the river condition at the position at which the river image is captured (step S101), and
  on the basis of the capturing position information, the river condition information, and topography information representing the topography of the river, predicts a river condition representing a river condition at a given point of the river that is different from the position represented by the capturing position information (step S102).

Since the present embodiment is configured as described above, the prediction device 100 detects, from a captured image obtained by capturing a point of a river, river condition information representing the river condition of the point, and predicts a river condition at a different given point of the river from the river condition information. Therefore, it is not necessary to provide a measurement device for measuring the water level or the like to the river. Further, even when there is a shortage of measurement devices, it is possible to predict the river condition of another desired point from a river image obtained at any point of the river. As a result, it is possible to improve the accuracy of predicting the river condition of a river.

Supplementary Notes

The whole or part of the exemplary embodiments disclosed above can be described as the following supplementary notes. Hereinafter, outlines of the configurations of a prediction method, a prediction device, and a program, according to the present invention, will be described. However, the present invention is not limited to the configurations described below.

Supplementary Note 1

A prediction method comprising:
  on a basis of a river image that is an image obtained by capturing a river and associated with capturing position information representing a position at which the river is captured, detecting river condition information representing a condition of the river at the position at which the river image is captured; and
  on a basis of the capturing position information, the river condition information, and topography information representing topography of the river, predicting a river condition representing a condition of the river at a given point of the river, the given point being different from the position represented by the capturing position information.

Supplementary Note 2

The prediction method according to supplementary note 1, further comprising
  predicting the river condition at the given point of the river, on a basis of capturing time information that represents time when the river image is captured and is associated with the river image, the capturing position information, the river condition information, and the topography information.

Supplementary Note 3

The prediction method according to supplementary note 2, further comprising
  predicting the river condition at the given point of the river and time when the condition becomes the river condition, on a basis of the capturing time information, the capturing position information, the river condition information, and the topography information.

Supplementary Note 4

The prediction method according to any of supplementary notes 1 to 3, further comprising
  predicting the river condition at a point of the river located on a downstream side of the position indicated by the capturing position information.

Supplementary Note 5

The prediction method according to any of supplementary notes 1 to 4, further comprising
  predicting the river condition at the given point of the river including a main stream and a branch, on a basis of the topography information.

Supplementary Note 6

The prediction method according to any of supplementary notes 1 to 5, further comprising
  predicting the river condition at the given point of the river by using weather information at a point on an upstream side of the given point of the river in which the river condition is predicted.

Supplementary Note 7

The prediction method according to any of supplementary notes 1 to 6, further comprising
  predicting the river condition at the given point of the river that is predicted for a predetermined river, as a river condition at a given point of another river determined to have topography that is similar to topography of the predetermined river on a basis of the topography information.

Supplementary Note 8

The prediction method according to any of supplementary notes 1 to 7, further comprising notifying an information processing device located at the given point of the river, of the river condition predicted for the given point of the river.

Supplementary Note 9

The prediction method according to any of supplementary notes 1 to 8, further comprising
acquiring the river image captured by a mobile information processing terminal; and
detecting the river condition at a position at which the river image is captured, on a basis of the river image.

Supplementary Note 10

The prediction method according to any of supplementary notes 1 to 9, wherein
the condition of the river includes a water level and a flow rate of the river.

Supplementary Note 11

A prediction device comprising:
detection means for, on a basis of a river image that is an image obtained by capturing a river and associated with capturing position information representing a position at which the river is captured, detecting river condition information representing a condition of the river at the position at which the river image is captured; and
prediction means for, on a basis of the capturing position information, the river condition information, and topography information representing topography of the river, predicting a river condition representing a condition of the river at a given point of the river, the given point being different from the position represented by the capturing position information.

Supplementary Note 12

The prediction device according to supplementary note 11, wherein
the prediction means predicts the river condition at the given point of the river, on a basis of capturing time information that represents time when the river image is captured and is associated with the river image, the capturing position information, the river condition information, and the topography information.

Supplementary Note 13

The prediction device according to supplementary note 12, wherein
the prediction means predicts the river condition at the given point of the river and time when the condition becomes the river condition, on a basis of the capturing time information, the capturing position information, the river condition information, and the topography information.

Supplementary Note 14

The prediction device according to any of supplementary notes 11 to 13, wherein
the prediction means predicts the river condition at a point of the river located on a downstream side of the position indicated by the capturing position information.

Supplementary Note 15

The prediction device according to any of supplementary notes 11 to 14, wherein
the prediction means predicts the river condition at the given point of the river including a main stream and a branch, on a basis of the topography information.

Supplementary Note 16

The prediction device according to any of supplementary notes 11 to 15, wherein
the prediction means predicts the river condition at the given point of the river by using weather information at a point on an upstream side of the given point of the river in which the river condition is predicted.

Supplementary Note 17

The prediction device according to any of supplementary notes 11 to 16, wherein
the prediction means predicts the river condition at the given point of the river that is predicted for a predetermined river, as a river condition at a given point of another river determined to have topography that is similar to topography of the predetermined river on a basis of the topography information.

Supplementary Note 18

The prediction device according to any of supplementary notes 11 to 17, further comprising
notification means for notifying an information processing device located at the given point of the river, of the river condition predicted for the given point of the river.

Supplementary Note 19

A program for causing a processor of an information processing device to execute processing to:
on a basis of a river image that is an image obtained by capturing a river and associated with capturing position information representing a position at which the river is captured, detect river condition information representing a condition of the river at the position at which the river image is captured; and
on a basis of the capturing position information, the river condition information, and topography information representing topography of the river, predict a river condition representing a condition of the river at a given point of the river, the given point being different from the position represented by the capturing position information.

Note that the program described above can be stored in a non-transitory computer-readable medium of any type and supplied to a computer. Non-transitory computer-readable media include tangible storage media of various types. Examples of non-transitory computer-readable media include magnetic storage media (for example, flexible disk, magnetic tape, and hard disk drive), magneto-optical storage media (for example, magneto-optical disk), a CD-ROM (Read Only Memory), a CD-R, a CD-R/W, and semiconductor memories (for example, mask ROM, PROM (Programmable ROM), and EPROM (Erasable PROM), a flash ROM, and a RAM (Random Access Memory)). Note that the program may be supplied to a computer by being stored in a transitory computer-readable medium of any type.

Examples of transitory computer-readable media include electric signals, optical signals, and electromagnetic waves. A transitory computer-readable medium can be supplied to a computer via a wired communication channel such as a wire and an optical fiber, or a wireless communication channel.

While the present invention has been described with reference to the exemplary embodiments described above, the present invention is not limited to the above-described embodiments. The form and details of the present invention can be changed within the scope of the present invention in various manners that can be understood by those skilled in the art.

REFERENCE SIGNS LIST 1 information processing system
10 image collection device
11 image collection unit
12 image storage unit
20 prediction device
21 acquisition unit
22 detection unit
23 prediction unit
24 notification unit
25 acquired image storage unit
26 user information storage unit
27 topography information storage unit
28 weather information storage unit
Ua, Ub, Uc user
UTa, UTb, UTc user terminal
100 prediction device
101 CPU
102 ROM
103 RAM
104 program group
105 storage device
106 drive
107 communication interface
108 input/output interface
109 bus
110 storage medium
111 communication network
121 detection means
122 prediction means

What is claimed is:

1. A prediction method performed by a computer and comprising:
  on a basis of a river image of a river associated with capturing position information representing a position at which the river image of the river is captured, detecting river condition information representing a condition of the river at the position; and
  on a basis of the capturing position information, the river condition information, and topography information representing topography of the river, when predicting a river condition representing the condition of the river at a given point of the river different from the position at which the river image was captured, as a river condition at the given point of another river that is determined to have topography similar to the topography of the river based on the topography information, weighting each of the river condition information detected from each of a plurality of river images and predicting a river condition on a basis of a plurality of the river condition information weighted.

2. The prediction method according to claim 1, further comprising
  predicting the river condition at the given point of the river different from the position at which the river image was captured, on a further basis of capturing time information that represents a time when the river image is captured and is associated with the river image.

3. The prediction method according to claim 2, further comprising
  predicting the river condition at the given point of the river different from the position at which the river image was captured, when the condition becomes the river condition.

4. The prediction method according to claim 1, further comprising
  predicting the river condition at the point of the river different from the position at which the river image was captured and which is located on a downstream side of the position indicated by the capturing position information.

5. The prediction method according to claim 1, further comprising
  predicting the river condition at the given point of the river different from the position at which the river image was captured and which includes a main stream and a branch.

6. The prediction method according to claim 1, further comprising
  predicting the river condition at the given point of the river different from the position at which the river image was captured, by further using weather information at a point on an upstream side of the given point of the river.

7. The prediction method according to claim 1, further comprising
  notifying an information processing device located at the given point of the river, of the river condition predicted for the given point of the river.

8. The prediction method according to claim 1, further comprising:
  acquiring the river image captured by a mobile information processing terminal; and
  detecting the river condition at the position at which the river image is captured, on a basis of the river image.

9. The prediction method according to claim 1, wherein the condition of the river includes a water level and a flow rate of the river.

10. The prediction method according to claim 1, further comprising
  weighting each of the river condition information detected from each of a plurality of river images according to the priority predetermined for the person specified by capturing person information associated with the river image; and
  predicting the river condition on a basis of a plurality of the river condition information weighted.

11. A prediction device comprising:
  at least one memory storing instructions; and
  at least one processor configured to execute instructions to:
  on a basis of a river image of a river associated with capturing position information representing a position at which the river image of the river is captured, detect river condition information representing a condition of the river at the position; and on a basis of the capturing position information, the river condition information, and topography information representing topography of the river, when predicting a river condition representing the condition of the river at a given point of the river different from the position at which the river image was captured, as a river condition at the given point of another river that is determined to have topography similar to the topography of the river based on the topography information, weight each of the river condition information detected from each of a plurality of river images and predict a river condition on a basis of a plurality of the river condition information weighted.

12. The prediction device according to claim 11, wherein the at least one processor is configured to execute the instructions to predict the river condition at the given point of the river different from the position at which the river image was captured, on a further basis of capturing time information that represents a time when the river image is captured and is associated with the river image.

13. The prediction device according to claim 12, wherein the at least one processor is configured to execute the instructions to predict the river condition at the given point of the river different from the position at which the river image was captured, when the condition becomes the river condition.

14. The prediction device according to claim 11, wherein the at least one processor is configured to execute the instructions to predict the river condition at the point of the river different from the position at which the river image was captured and which is located on a downstream side of the position indicated by the capturing position information.

15. The prediction device according to claim 11, wherein the at least one processor is configured to execute the instructions to predict the river condition at the given point of the river different from the position at which the river image was captured and which includes a main stream and a branch.

16. The prediction device according to claim 11, wherein the at least one processor is configured to execute the instructions to predict the river condition at the given point of the river different from the position at which the river image was captured, by further using weather information at a point on an upstream side of the given point of the river.

17. The prediction device according to claim 11, wherein the at least one processor is configured to execute the instructions to notify an information processing device located at the given point of the river, of the river condition predicted for the given point of the river.

18. A non-transitory computer-readable medium storing a program executable a processor of an information processing device to perform processing to:

on a basis of a river image of a river associated with capturing position information representing a position at which the river image of the river is captured, detect river condition information representing a condition of the river at the position; and on a basis of the capturing position information, the river condition information, and topography information representing topography of the river, when predicting a river condition representing the condition of the river at a given point of the river different from the position at which the river image was captured, as a river condition at the given point of another river that is determined to have topography similar to the topography of the river based on the topography information, weighting each of the river condition information detected from each of a plurality of river images and predicting a river condition on a basis of a plurality of the river condition information weighted.

* * * * *